US010353658B2

(12) United States Patent
Tsai et al.

(10) Patent No.: US 10,353,658 B2
(45) Date of Patent: Jul. 16, 2019

(54) HUMAN MACHINE INTERFACE (HMI) CONTROL UNIT FOR MULTIPLE VEHICLE DISPLAY DEVICES

(71) Applicant: Toyota Motor Sales, U.S.A., Inc., Torrance, CA (US)

(72) Inventors: David Tsai, Irvine, CA (US); Steven Basra, Frisco, TX (US); John McLaughlin, Huntington Beach, CA (US); Shady Shahid, Piedmont, CA (US); Greg McNamara, San Francisco, CA (US); Per Selvaag, Berkeley, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 299 days.

(21) Appl. No.: 15/272,699

(22) Filed: Sep. 22, 2016

(65) Prior Publication Data

US 2018/0081614 A1    Mar. 22, 2018

(51) Int. Cl.
*G06F 3/048* (2013.01)
*G06F 3/14* (2006.01)
(Continued)

(52) U.S. Cl.
CPC ............ *G06F 3/1423* (2013.01); *B60K 35/00* (2013.01); *B60K 37/06* (2013.01);
(Continued)

(58) Field of Classification Search
None
See application file for complete search history.

(56) References Cited

U.S. PATENT DOCUMENTS 6,240,347 B1    5/2001  Everhart et al.
2006/0155431 A1  7/2006  Berg et al.
(Continued)

FOREIGN PATENT DOCUMENTS

GB          2517961       3/2015
WO   WO2012156029 A1   11/2012
WO   WO2014096975 A2    6/2014

OTHER PUBLICATIONS

Extended European Search Report for Application No. 17192204.0 dated Feb. 27, 2018 in 9 pages.

*Primary Examiner* — William C Trapanese
(74) *Attorney, Agent, or Firm* — Christopher G. Darrow; Darrow Mustafa PC

(57) ABSTRACT

Devices and methods in a configurable human machine interface (HMI) for multiple vehicle display devices are disclosed. An example of the method includes, in the HMI control unit for a plurality of vehicular display devices, receiving action input data from a configurable application input module in a first operational mode. In the first operational mode a first vehicular display device operates as a master vehicular display device relative to a second vehicular display device. The second vehicular display device is mirrored to the first vehicular display device. When action input data indicates a transition from the first operational mode to a second operational mode, the method continues by generating a control message based on the action input data. The control message indicates that the second vehicular display device operates as the master vehicular display device and that the first vehicular display device provides mirrored feedback relating to a subsequent action input data affecting a corresponding graphic user element of the second vehicular display device.

18 Claims, 8 Drawing Sheets

(51) Int. Cl.
  *G06F 3/0488*  (2013.01)
  *G06F 3/0482*  (2013.01)
  *B60K 35/00*  (2006.01)
  *B60K 37/06*  (2006.01)
  *G01C 21/36*  (2006.01)
  *G09G 5/14*  (2006.01)

(52) U.S. Cl.
  CPC ....... *G01C 21/3688* (2013.01); *G06F 3/0482* (2013.01); *G06F 3/04883* (2013.01); *G06F 3/1454* (2013.01); *G09G 5/14* (2013.01); *B60K 2350/1004* (2013.01); *B60K 2350/104* (2013.01); *B60K 2350/1024* (2013.01); *B60K 2350/1028* (2013.01); *B60K 2350/1032* (2013.01); *B60K 2350/2052* (2013.01); *G06F 2203/04803* (2013.01)

(56) References Cited

U.S. PATENT DOCUMENTS

| | | |
|---|---|---|
| 2010/0220250 A1 | 9/2010 | Vanderwall et al. |
| 2011/0130921 A1 | 6/2011 | Ono et al. |
| 2013/0218412 A1* | 8/2013 | Ricci .................. G06F 17/00 701/36 |
| 2015/0066360 A1* | 3/2015 | Kirsch ............... G01C 21/3688 701/438 |
| 2016/0054967 A1 | 2/2016 | Cota Gonzalez et al. |

* cited by examiner

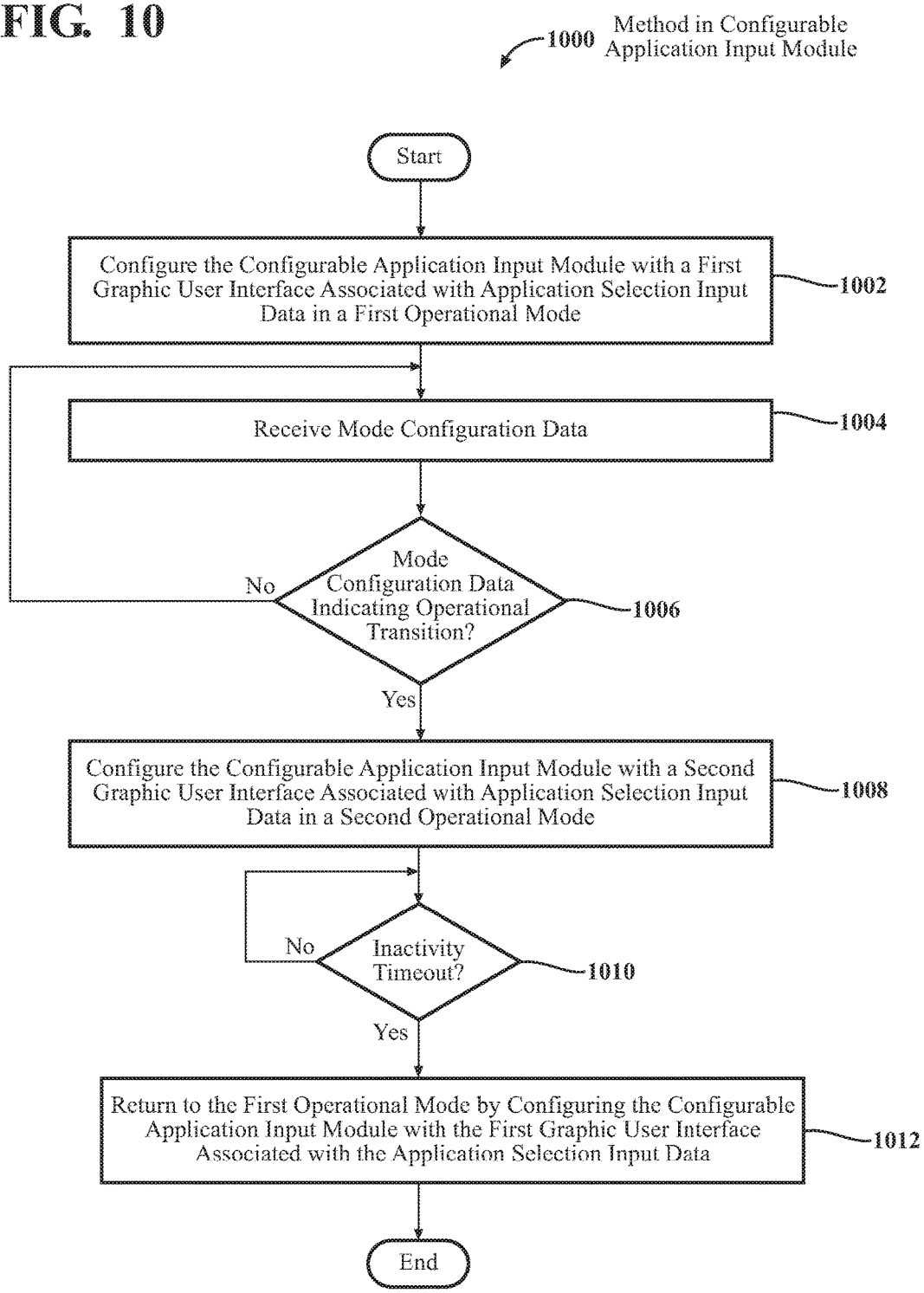

HUMAN MACHINE INTERFACE (HMI) CONTROL UNIT FOR MULTIPLE VEHICLE DISPLAY DEVICES

BACKGROUND

Human machine interfaces with multiple vehicle display units provide challenges to the vehicle operator with respect to minimizing distractions, and focusing on the vehicle path, or course, ahead of the vehicle. It is desirable that a vehicle user have the capability of providing user input to applications displayed on a selected one of several vehicle displays with input feedback from non-selected ones of the vehicle displays, and to also present user input controls that provides different graphic user interfaces based upon the active applications.

SUMMARY

Devices and methods for human machine interface (HMI) control unit for multiple vehicle display devices are disclosed.

In one implementation, a method in a human machine interface (HMI) control unit for a plurality of vehicular display devices is disclosed. The method includes receiving action input data from a configurable application input module in a first operational mode. In the first operational mode a first vehicular display device of the plurality of vehicular display devices operates as a master vehicular display device relative to a second vehicular display device of the plurality of vehicular displays, and the second vehicular display operates to provide mirrored feedback corresponding to the first vehicular display device. When action input data indicates a transition from the first operational mode to a second operational mode, the method continues by generating a control message based on the action input data, the control message including a first identifier for the first vehicular display device and a second identifier for a second vehicular display device. The control message indicates that the second vehicular display device operates as the master vehicular display device and that the first vehicular display device operates to provide the mirrored feedback relating to a subsequent action input data affecting a corresponding graphic user element of the second vehicular display device. The method continues by transmitting the control message to place the first and the second vehicular display devices in the second operational mode.

In another implementation, a human machine interface (HMI) control unit is disclosed. The HMI control unit includes a communication interface to service communication with vehicular devices, one or more processors coupled to the communication interface, the one or more processors for controlling operations of the human machine interface control unit, and a memory coupled to the one or more processors, the memory for storing data and program instructions used by the one or more processors. The one or more processors are configured to execute instructions stored in the memory to receive action input data from a configurable application input module in a first operational mode. In the first operational mode a first vehicular display device of the plurality of vehicular display devices operates as a master vehicular display device relative to a second vehicular display device of the plurality of vehicular displays, and the second vehicular display operates to provide mirrored feedback corresponding to the first vehicular display device. When the action input data indicates a transition from the first operational mode to a second operational mode, the one or more processors are configured to execute instructions stored in the memory to generate a control message based on the action input data, the control message including a first identifier for the first vehicular display device and a second identifier for a second vehicular display device. The control message indicates that the second vehicular display device operates as the master vehicular display device and that the first vehicular display device operates to provide the mirrored feedback relating to a subsequent action input data affecting a corresponding graphic user element of the second vehicular display device. The one or more processors are configured to execute instructions stored in the memory to transmit the control message to place the first and the second vehicular display devices in the second operational mode.

In yet another implementation, a human machine interface (HMI) device for use in a vehicle is disclosed. The HMI device includes a configurable application input module configured to be accessible through a control surface of the vehicle, and a HMI control unit in communication with the configurable application input module. The configurable application input module includes a touch screen, and a graphic user interface (GUI) data generator coupled to the touch screen display and operable to present a graphic user interface for display by the touch screen. The HMI control unit includes a communication interface to service communication with vehicular devices, one or more processors coupled to the wireless communication interface, the one or more processors for controlling operations of the human machine interface (HMI) control unit, and memory coupled to the one or more processors, the memory for storing data and program instructions used by the one or more processors. The one or more processors are configured to execute instructions stored in the memory to receive an action input data, via a touch screen of the configurable application input module, in a first operational mode, wherein in the first operational mode a first vehicular display device of the plurality of vehicular display devices operates as a master vehicular display device relative to a second vehicular display device of the plurality of vehicular displays, the second vehicular display operates to provide mirrored feedback corresponding to the first vehicular display device. When the action input data indicates a transition from the first operational mode to a second operational mode, the one or more processors are further configured to execute instructions stored in the memory to generate a control message based on the action input data, the control message including a first identifier for the first vehicular display device and a second identifier for a second vehicular display device, wherein the control message indicates that the second vehicular display device of the plurality of vehicular display devices operates as the master vehicular display device and that the first vehicular display device operates to provide the mirrored feedback relating to a subsequent action input data affecting a corresponding graphic user element of the second vehicular display device. The one or more processors are further configured to execute instructions stored in the memory to configure the touch screen by providing mode configuration data to the GUI data generator of the configurable application input module.

BRIEF DESCRIPTION OF THE DRAWINGS

The description makes reference to the accompanying drawings wherein like reference numerals refer to like parts throughout the several views, and wherein:

FIG. 10 is an example process in a human machine interface (HMI) device for configuring associated display for a configurable application input module's touch screen.

DETAILED DESCRIPTION

A configurable human machine interface (HMI) apparatus and method is provided with a configurable application input module, such as, for example, a touch screen device that may provide input by a vehicle user. The configurable application input module may be modified and/or changed based upon an application selected by the vehicle user. The selected application is displayed within a display or a zone of a display of at least first and second vehicle display screens. The displays for the selected application may be visually modified based on first and second operational modes, selectable by the vehicle user, for the operation of the configurable HMI apparatus and method disclosed herein. The first operational mode may be referred to as a locked mode, which may also be a default mode of operation. For example, in the first operational mode, a first display device may operate as a master relative to another display device. Vehicle user input, provided though the configurable application input module, is reflected in the master device while another display device operates to provide mirrored feedback back to the user. In the second operational mode, which may be referred to as an unlocked mode, a second display device may operate as the master relative to the first display device, where the second display device reflects the vehicle user's input while the another, or first display device in this example, provides the mirrored feedback. As may be appreciated, the vehicle display devices may include an upper display device, such as a heads-up vehicle display to provide a line-of-sight display information, and a lower display device, such as a console display device mounted on a vehicle console.

Figure 1:
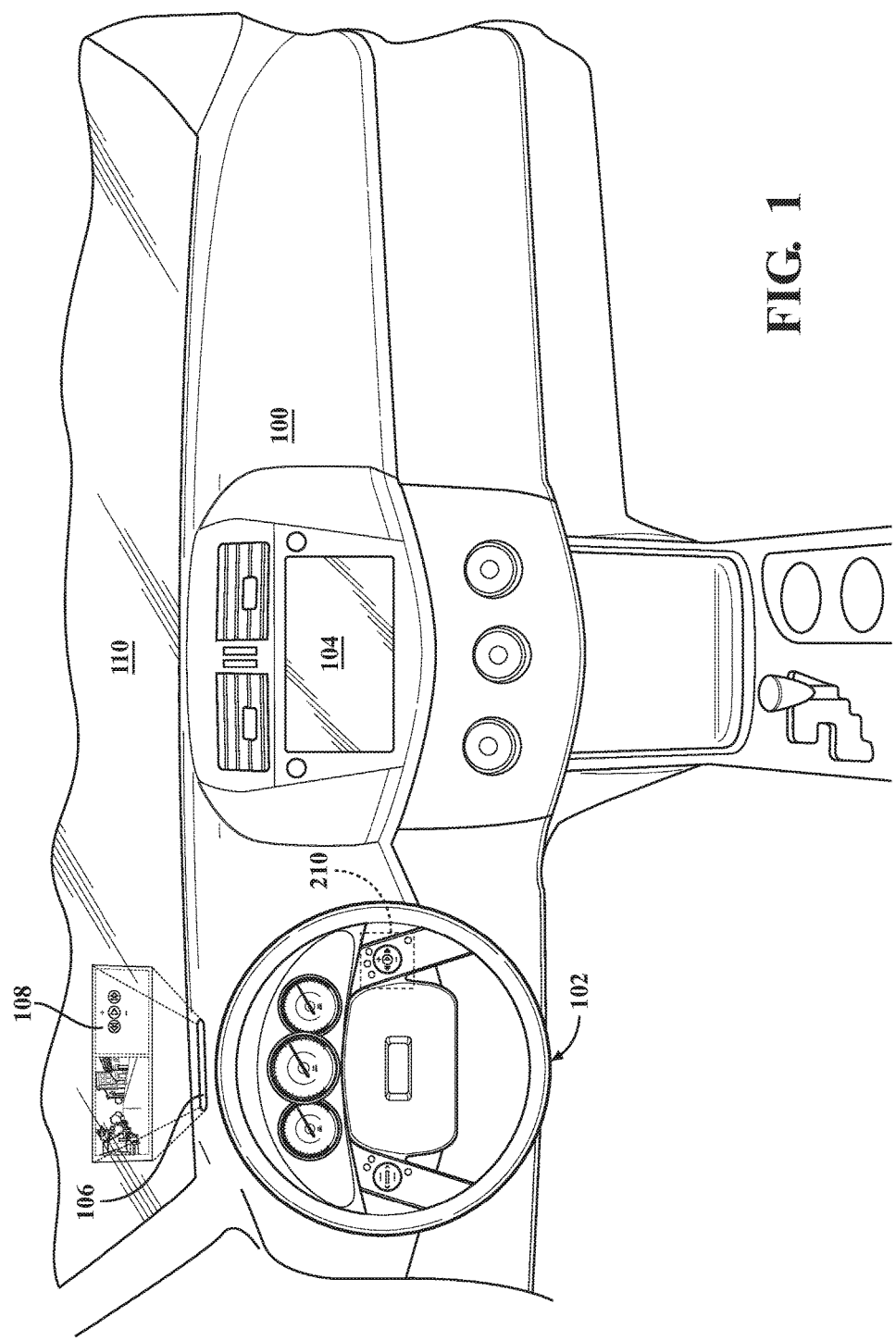
FIG. 1 is a plan view of a vehicle dash panel including a plurality of display devices and human machine interface (HMI) control unit.

FIG. 1 is a plan view of a vehicle dash panel 100. The dash panel 100 includes a steering assembly 102, a lower display device 104, and an upper display device 106. As may be appreciated, also included is an instrument cluster, ventilation components, dashboard assemblies, etc. The steering assembly 102 includes a human machine interface (HMI) control unit 210.

The HMI control unit 210 operates in at least two operation modes in relation with the lower display device 104 and the upper display device 106. The first being a locked mode and the second being an unlocked mode.

In the locked mode, the vehicle operator manipulates graphic user elements of the lower display device 104 while the upper display device 106 mirrors activity with the lower display device 104.

In the unlocked mode, which may be entered via a pressure sequence or distinct input by the vehicle user to the HMI control unit 210, the vehicle operator may manipulate graphic user elements of the upper display device 106 while the lower display device 104 mirrors activity with the upper display device 106. Following an inactivity timeout expiration, the HMI control unit 210 returns to the first operational mode—the locked state.

The lower display device 104 may be provided as a touch screen or other larger display device having a sufficient tactile feel, passive safety, and air bag accommodation with respect to the operation of the respective vehicle. The lower display device 104 may operate as a functional control system, providing several display zones within the screen display associated with various vehicles systems, such as audio visual, telephony, mapping, automotive operational conditions (e.g., tire pressures, engine temperature, and automotive warnings), etc. In other functional aspects, the lower display device 104 may also function as vehicle controls, the vehicle operation information presentation, and the telephonic functional displays.

Also, in other operational modes, the lower display device 104 can operate to provide information from vehicle cameras and other inputs directed where needed by the vehicle user (as such information can temporarily, as in time of stress or crisis, replace some or all of the functional displays, for example of speed or engine RPM). For example, the lower display device 104 may provide visual information with operational modes including a standard screen, a highway screen, an audio enjoyment screen, a night vision and fog screen, and/or a difficult driving or crisis screen (e.g., very heavy traffic, ice conditions, etc.). The lower display device may also provide a malfunction and alarm screen, a telephonic and Email screen, a climate control optimization screen, an Internet and communication screen (passenger-side), an Internet and communication screen (driver-side moving/stopped), a "preflight" checkout screen to allow the driver to ascertain correct functions and settings of various subsystems, a preventive maintenance screen, with data, predicted service times, and even camera images of key parts of vehicle (e.g., wheels, engine, etc.), navigational screens, including GPS based MAP data, a local navigational screen for parking (such as use of camera and other sensory data (microwave, ultrasound, LIDAR, etc) are enhanced/magnified and presented to the screen).

To aid in parking or navigating in tight quarters, the lower display device 104 may operate to provide a parking spot screen (e.g., providing data on parking locations, using data downloaded to the vehicle upon entering or nearing a parking garage, a vehicle airflow representation with different HVAC and vent position settings, a 3D representation of sound, with different settings, including if desired the monitoring of ambient sound, a 3D representation of rear and front viewing situations by various optical subsystems (mirrors, cameras, IR or other night vision, etc) and radar subsystems if used.

The lower display device 104 may occupy a larger portion of the width of the dash panel 100 as permitted by dash design constraints, may be located in front of the vehicle user, and may also be located in the center of the dash panel 100. In another aspect, the lower display device 104 may occupy the space in front of the driver, in the instrument cluster area to provide while in operation traditional vehicle functional aspects, such as speed, RPM, engine temperature, etc., or change to others of the screens as may be permitted or limited based upon the vehicle operational mode.

The upper display device 106 operates to project a display to an upper display panel 108. The upper display device 106 provides a line-of-sight or heads-up display device for a vehicle operator to minimize distractions from the travel path by being able to view information while looking forward, and instead of angled down looking at lower instructions and/or display information.

In general, the upper display device 106 may include, for example, a projector unit, a combiner, and a video generator. The projector unit operates to produce an image where the light has a focal point perceived to be at infinity. The combiner is provided by the upper display panel 108, which operates to redirect the image projected by the upper display device 106 with the field of view to be viewed at substantially the same time, and may be provided as a coating to a windshield 110 to receive the light projected onto it from the projector of the upper display device 106 while allowing other light wavelengths to pass. The upper display device 106 may also be provided as a separate surface having similar light wavelength characteristics. The video generator of the upper display device 106 operates to interface with the systems and/or data to be displayed by the upper display device 106, and generates imagery and symbology to be displayed by the upper display device 106.

The upper display panel 108 may have an operational mode where at least a portion (or zone) of the upper display panel 108 provides mirrored and/or visual feedback to the vehicle user corresponding to the operations and/or function of the lower display device 104, such as via a feedback application operable by the upper display panel 108. A remaining portion of the upper display panel 108 may operate to provide navigational display functionality to the vehicle user.

These examples of screens do not represent all functions that may be provided, and are capable of multiple display functionality on a singular window/zone region of the display, or with multiple zones each representing respective functional displays. Accordingly, the lower display device 104 may be switched between display states by an external button, an integral button, a tactile sensor display of the lower display device 104, motion sensing input, etc.

Referring to FIG. 1, the HMI control unit 210 operates to allow a user to switch among the screens, as described in detail with respect to FIGS. 2-10, and operate to trigger and/or switch individual functions or applications based upon human command inputs. As may also be appreciated, the lower display device 104 may also provide other bases for human input, such as hand motions, head motions, finger motions, speech and/or voice, etc.

Figure 2:
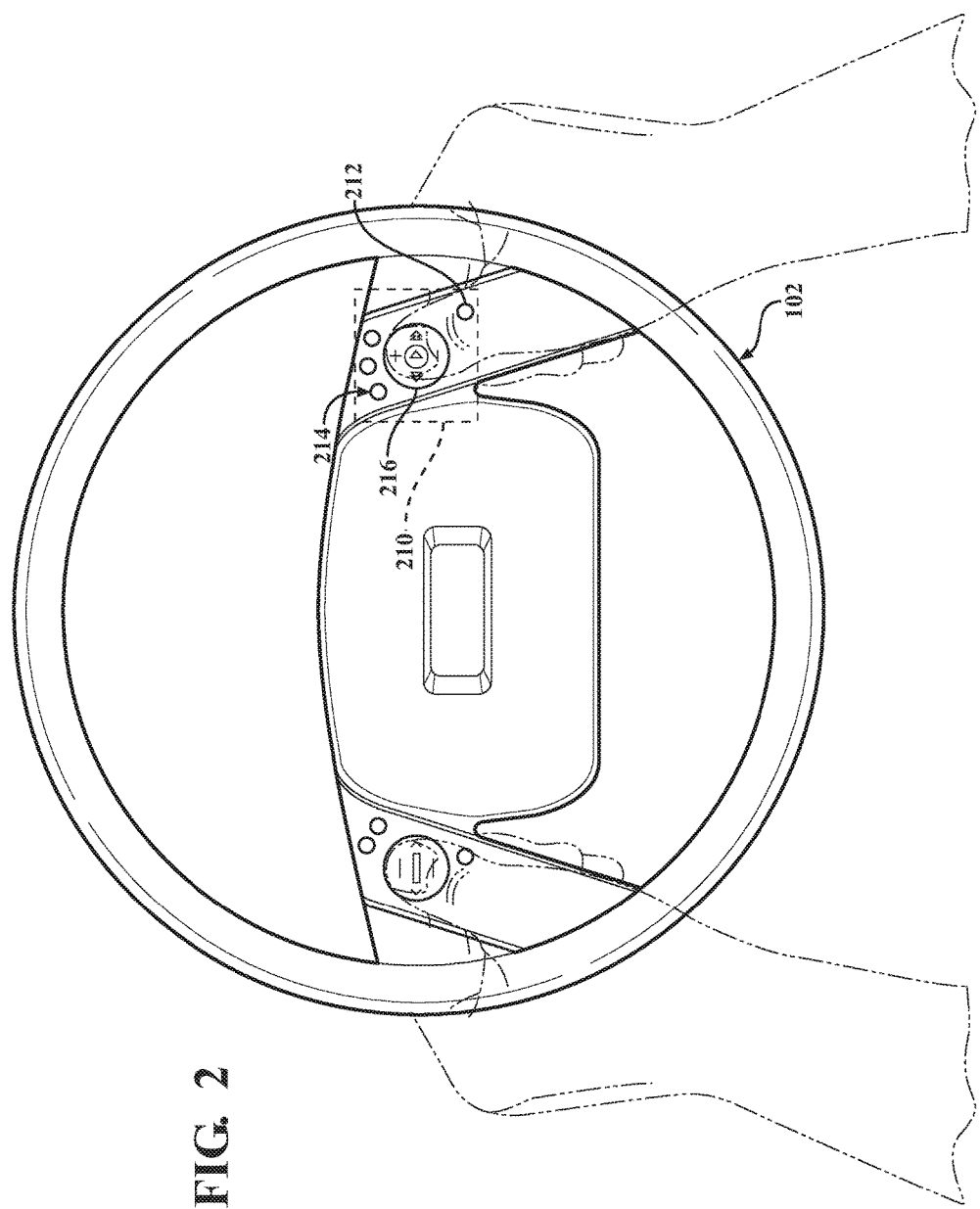
FIG. 2 is a plan view illustrating a steering assembly with a HMI control unit as shown in FIG. 1.

FIG. 2 is an illustration of a steering assembly 102 with an HMI control unit 210. The HMI control unit 210 includes a menu hotkey 212, a plurality of hotkeys 214, and a configurable application input module 216 having a configurable touch screen embodiment for user input.

The HMI control unit 210 is depicted in ghost lines to reflect that a control unit may be concealed within the steering assembly 102, with surface components being accessible by a vehicle user. As may be appreciated, the HMI control unit 210 may be located apart from the surface input areas. For example, the HMI control unit 210 may be contained within a steering column, integrated with other electronic control units for the vehicle, etc.

As shown, the menu hotkey 212, hotkeys 214, and configurable application input module 216 are placed adjacent a control surface of the steering assembly 102 for access by the vehicle user, such as by a depression by the user's thumb, or a location suitable to receive a sliding motion on the configurable application input module 216.

Each of the hotkeys 214 may operate to provide application selection input data, which correspondingly affects the display surface of the configurable application input module 216. In other words, the configurable application input module 216 includes a touch screen that presents a configurable graphic user interface for interaction with the vehicle user. The touch screen is an input device that may be layered on the top of an electronic visual display of the HMI control unit 210. The vehicle user may provide input or control data through simple or multi-touch gestures by touching the screen of the configurable application input module 216 with one or more fingers. The vehicle user can use the touch screen to react to what is displayed via the lower and upper display devices 104 and 106 (see, e.g., FIG. 1). The configurable application input module 216 may be provided by suitable touch screen technologies, for example, as a resistive touch screen, a surface acoustic wave touch screen, a capacitive touch screen, a surface capacitance touch screen, etc.

A touch screen of the configurable application input module 216 includes a touch region generated by the user's finger. When the user's finger comes close to the configurable application input module 216, touch data can be generated that identifies a plurality of pixels, depending on the type of touch screen employed. Each pixel in the touch region may be characterized by touch magnitudes corresponding to the pressure of the touch. In another embodiment, touch data can correspond to a binary indication that a pixel is either touched or not touched. While shown as a circular periphery, touch region for the configurable application input module 216 can be of another shape, including an irregular shape and a noncontiguous region.

The graphic user interface of the configurable application input module 216 is configurable based on the function selected via the menu hotkey 212 and/or the hotkeys 214. For example, when a hotkey is selected for a music application, the application selection input data causes the configurable application input module 216 to display control features for that application, such as "skip," "fast forward," "play," "pause," etc. As another example, when another hotkey is selected for a telephony application, the application selection input data cause the configurable application input module 216 to display control features for telephony data, such as "call," "hang up," etc. Configuration of the configurable application input module 216 is discussed in detail with reference to FIGS. 3-10.

Figure 3:
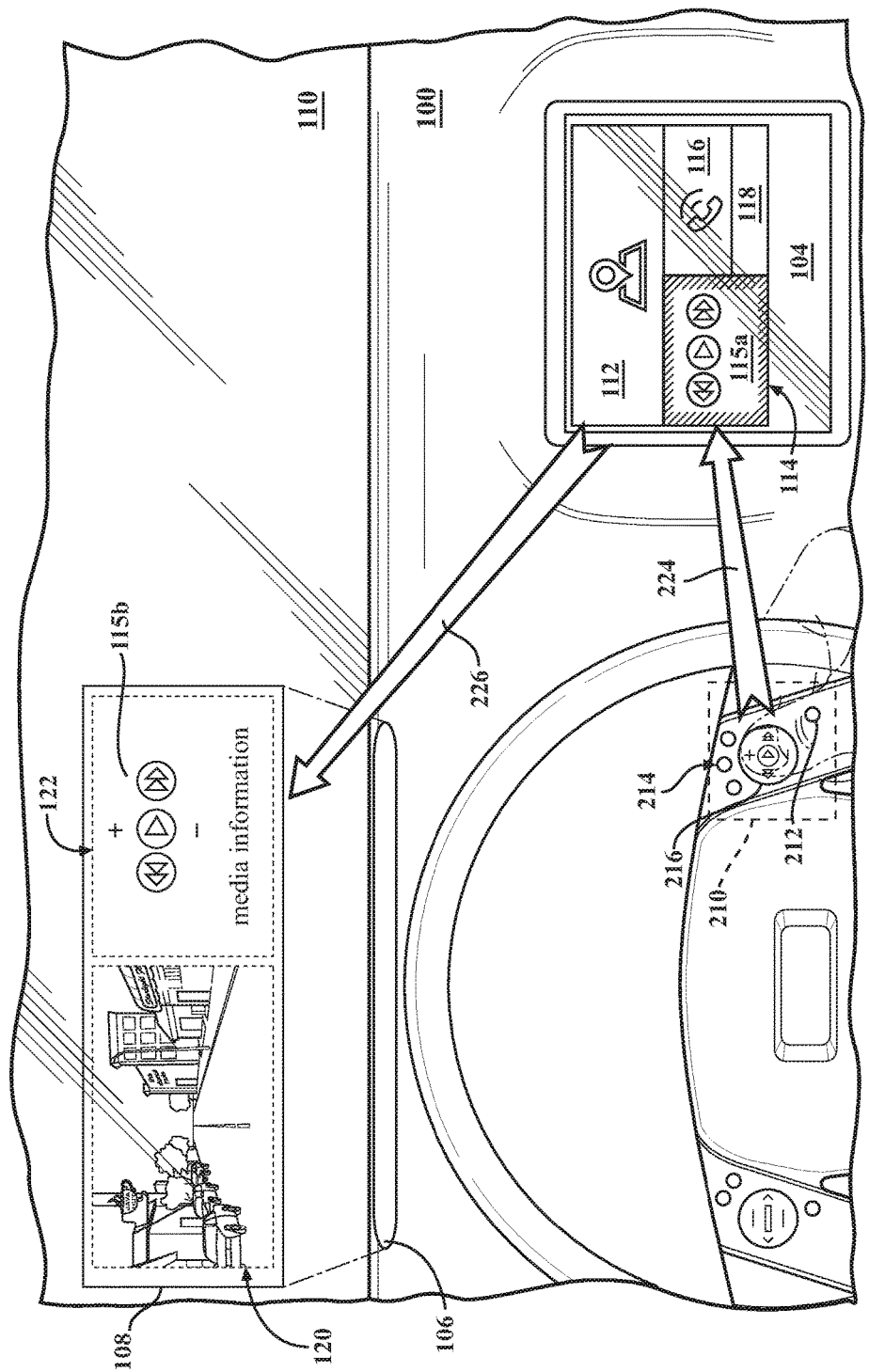
FIG. 3 is a functional diagram illustrating a first operational mode with regard to the plurality of display devices of FIG. 1.
Figure 4:
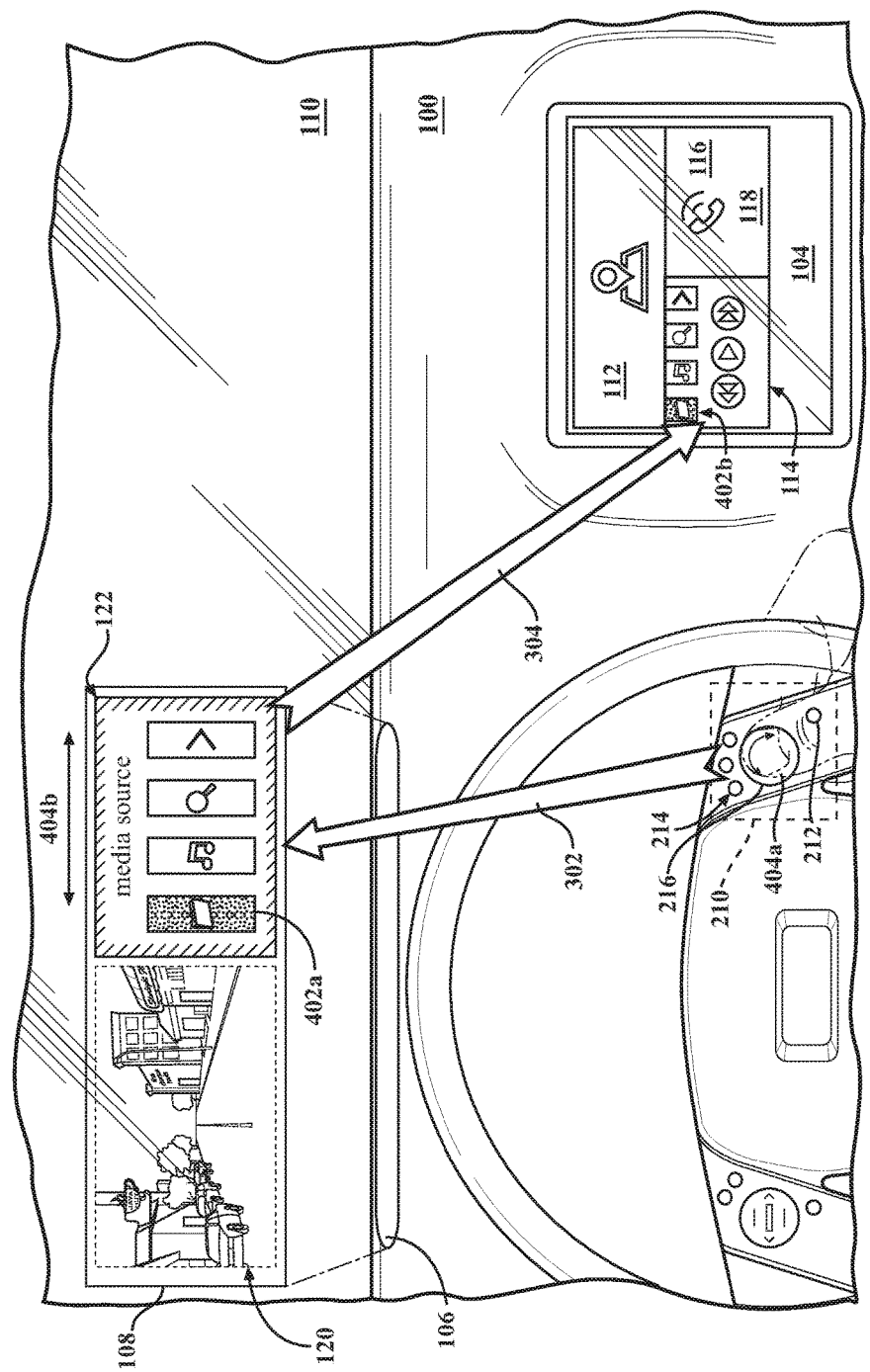
FIG. 4 is a functional diagram illustrating a second operational mode with regard to the plurality of display devices of FIG. 1.

FIGS. 3 and 4 illustrate the HMI control unit 210 having at least a first operational mode and a second operational mode with regard to the lower display device 104 and the upper display device 106.

FIG. 3 illustrates a first operational mode, in which the HMI control unit 210 directs inputs via the configurable application input module 216 to a corresponding application of the lower display device 104. The upper display device 106 provides a line-of-sight feedback that does not require the vehicle user to divert their attention from the road ahead. In the first operational mode, the lower display device 104 operates a master vehicular display device relative to the upper display device 106.

In FIG. 3, a hotkey of the plurality of hotkeys 214 operates to select an application for control input, which operates to cause a zone of the lower display device 104 to be active for receiving input from the vehicle user. The menu hotkey 212 operates to provide a menu of selectable items in the alternative to an assigned hotkey 214. For example, the menu hotkey 212 may present selections that pertain to a basic application (music, navigation, telephony, camera video, etc.), or when a display zone is selected, provide selections that relate to the display zone. For example, for an audio application, the menu hotkey 212, when pressed, provides an overlay selection window with audio selections such as audio source (over-the-air radio, compact disc, USB data files, steamed-audio data sources, wireless or wired tethered stand-alone device, etc.).

As shown, the lower display device 104 may have several applications defined in each of display zones 112, 114, 116, and 118. For example, a first display zone 112 includes a navigation application to provide route and vehicle guidance to the user. A second display zone 114 includes a music application for the playback of music, or tunable over-the-air selections, or Internet streamed data, etc. In the example of FIG. 3, the music application is selected.

As may be appreciated, each of the display zones 112, 114, 116, and 118 may be static in size, or may be dynamically-increased in size relative to the others when activated/selected so that a user may have easier viewing of the respective graphic user interface controls.

The HMI control unit 210 permits a vehicle user to provide data input to the application of the second display zone 114. The configurable application input module 216 receives user input by depressing or touching the contextual control depicted by the module's display surface. In the example of FIG. 3, a first operational mode provides input on a first set of control inputs, which may correspond with the controls displayed by the second display zone 114. When a user input is received, the HMI control unit 210 converts the input to a code, which is provided as a control message 224 to the lower display device 104. Messaging and network architectures are discussed in detail with reference to FIGS. 5-10.

With respect to the lower display device 104, feedback may be indicated to the vehicle user by a brief color image transition to a graphic user element 115a. For example, a graphic user element may flash, change in color or hue, etc., to indicate the input was received. Further feedback may be provided, such as a change in a media information label describing the content being played back to the user.

With respect to the upper display device 106, the display includes an enhancement zone 120 and an application mirror zone 122. The enhancement zone 120 provides heads-up enhancement, such as navigation indicators (direction, speed, turn indicators, etc.) that provide a form of augmented reality relating to the surrounding vehicle environment. The application mirror zone 122 depicts a simplified status display of the active display zone of the lower display device 104. In the example provided, the application mirror zone 122 depicts a corresponding graphic user element 115b. Actions relating to the second display zone 114 are reflected in the mirror zone 122 via a mirrored feedback message 226. The mirrored feedback message 226 includes information relating to the display of the lower display device 104, which is then visually provided to the vehicle user by the application mirror zone 122. For example, when the vehicle user manipulates the graphic user element 115a, a vehicle user may view similar manipulations of a corresponding graphic user element 115b of the application mirror zone 122.

As may be appreciated, a timeout may occur with respect to the upper display device 106 to provide dynamic sizing of enhancement and application mirror zones 120 and 122. That is, when a vehicle user is not actively inputting control commands to an active application of the lower display device 104, the application mirror zone 122 may reduce to a further minimal information display, such as providing a graphic user display that reciting "media information." The enhancement zone 120, accordingly, may increase in size to provide information relating to the principal application activity.

FIG. 4 illustrates a second operational mode, in which the HMI control unit 210 directs inputs via the configurable application input module 216 to a corresponding application displayed in the upper display device 106. In the second operational mode, the upper display device 106 operates a master vehicular display device relative to the lower display device 104.

In the second operational mode, the vehicle user may be engaging in an activity that requires additional time and focus away from the road, such as in the music application example, selecting a content source, conducting a content search, etc. To make use of the upper display device 106, the vehicle user may transition to the second operational mode based on action input data from the configurable application input module 216. To transition, the action input data is distinguishable from general application command inputs presented by the touch screen of the configurable application input module 216. An example of such an action input data may be a continuous depression, or a scrolling motion, about the touch screen for a predetermined amount of time. Upon indicating a transition in displays, the HMI control unit 210 generates a control message 302 indicating that the upper display device 106 operates as a master vehicular display device relative to the lower display device 104. The lower display device 104 serves to provide mirror feedback via a mirrored feedback message 304.

Referring to the example provided in FIG. 4, the configurable application input module 216 now depicts another graphic user interface, which in this example is a "scrolling input function." The configurable application input module 216 permits a vehicle user to manipulate the active application mirror zone 122 (indicated by directional input 404a) to scroll through media source options of the active application mirror zone 122, as indicated by corresponding scrolling action 404b. As a further example, a graphic user element 402a may be highlighted as a selected source, with the lower display reflecting a corresponding graphic user element 402b being selected for feedback purposes. In effect, the lower display device 104 operates to mirror the active application mirror zone 122.

When in the second operational mode, the configurable application input module 216, the lower display device 104, and the upper display device 106, may operate to return to the first operational mode. The transition between operational modes may occur based on an active command by the vehicle user (such as another continuous depression of the configurable application input module), or based on the expiration of an inactivity time period. In either example, the first vehicular display device and the second vehicular display device return to the master/slave relation of the first operational mode.

Figure 5:
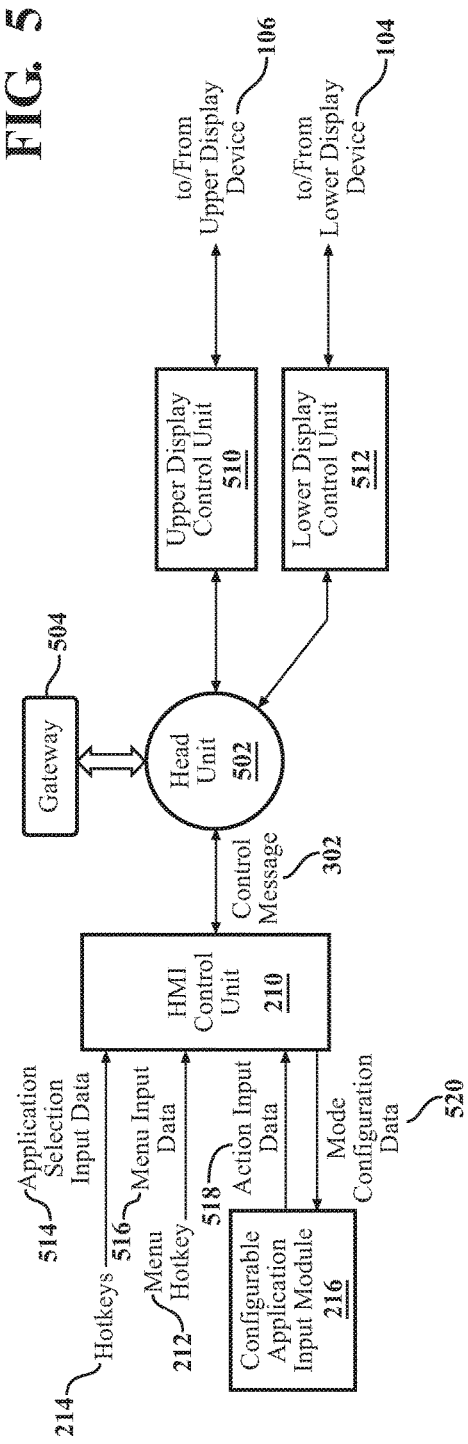
FIG. 5 a block diagram of a vehicle network that includes the HMI control unit, an upper display control unit, and a lower display control unit.

FIG. 5 is a block diagram of a vehicle network 500 that includes the HMI control unit 210, a central head unit 502, an upper display control unit 510, a lower display control unit 512, and a gateway 504.

For simplicity, the upper and lower display control units 510 and 512 relating the operation of the lower and upper display devices 104 and 106 and the HMI control unit 210 are displayed, with the understanding that other control units may be present and interacting within the vehicle network 500. A suitable configuration may operate at or about 17.8 kbps with 0 to 32 bytes of data with each message frame conveyed over the vehicle network 500. This aspect of the vehicle network 500 generally allows more (and greater featured) audio and video components to be integrated into a vehicle.

As shown, the vehicle network 500 includes the head unit 502, which acts as a conduit to transmit messages. The vehicle network 500 may be provided based on various network structures, such as, by way of example, a star-architecture, a daisy-chain architecture, a mesh architecture, a bus architecture, or other suitable network architecture.

The HMI control unit 210, the upper display control unit 510, and the lower display control unit 512, are coupled to the head unit 502. In this manner, damage caused by line failure may be reduced by coupling the control units 210, 510, and 512 to the head unit 502. When applied to a bus-based network, this head unit 502 may rebroadcast transmissions received from any control unit to all control units on the network, sometimes including the originating control unit. All peripheral nodes may communicate with all others by transmitting to, and receiving from, the head unit 502. The failure of a transmission line linking any control unit 210, 510, and 512, to the head unit 502 will result in the isolation of that control unit from all others, but the remainder of the vehicle network 500 will be unaffected.

The control units 210, 510, and 512, head unit 502, and gateway 504 may be coupled by wired/fiber couplings, which may include, for example, twisted pair cable, coaxial cable, optical fiber cable, and may also be coupled by wireless communications under wireless protocols, such as wireless area network, mesh network, Bluetooth, Near Field Communication, etc.

The HMI control unit 210 receives application selection input data 514 from hotkeys 214. The applicaion selection input data 514 includes, for example, an application selection for a display zone of the lower display control unit 512, and mirrored application information for the upper display control unit 510. The HMI control unit 210 also receives menu input data 516 from the menu hotkey 212, which based upon the functionality of the vehicle network 500, operates to provide further input selections to a vehicle user via the lower display control unit 512, and in a graphically-minimized context, via the a mirrored feedback through the upper display control unit 510.

The configurable application input module 216 provides action input data 518 based on a user selection. The action input data 518 operates to provide commands relative to an active, or selected, application. In the example provided earlier, the action input data 518 in a music application context may include commands such as "advance," "play," "pause," etc. Such action input data 518 is formatted by the HMI control unit 210 for transmission to the upper and lower display control units 510 and 512. Upper display control unit 510 is coupled for communication to the upper display device 106 for graphic presentation to a vehicle user. Lower display control unit 512 is coupled for communication to the lower display device 104 for graphic presentation of an application to the vehicle user. The graphic presentation of the upper display is abridged, or further concise, relative to that for the lower display device 104 in view of the available display space provided by the respective devices.

The action input data 518 may also include a transition command for an operational mode of the lower display control unit 512 and the lower display control unit 512. As discussed, the first operational mode is that the configurable application input module 216 operates with the lower display device 104 in a first operational mode. The mode may be considered a locked mode with regard to the inputs of the configurable application input module 216, while the application mirror zone 122 of the upper display device 106 operates as a slave to the master of the lower display device 104.

Upon a transition command, the application mirror zone 122 serves as a master display relative to the second display zone 114. In effect, the configurable application input module 216 is no longer "locked" to the lower display device 104, and a vehicle user is able to provide input based on the graphic user interface of the upper display device 106 via the configurable application input module 216.

The HMI control unit 210 provides mode configuration data 520. The mode configuration data 520 includes a graphic user interface related to the application selection input data 514, or to the menu input data 516. With respect to the operational mode, the mode configuration data 520 further includes a graphic user interface related to the first operational mode (see FIG. 3) and another graphic user interface related to the second operation mode (see FIG. 4).

Figure 6:
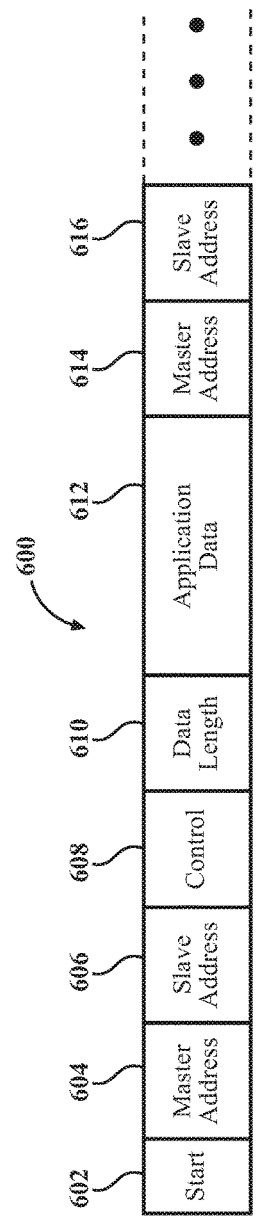
FIG. 6 is an illustration of a message format that may be used in the transmission and/or receipt of messages in the vehicle network of FIG. 5.

The gateway 504 may be provided as a control unit. The gateway 504 permits communication between vehicle networks with different communication data formats, such as a body electric area network (BEAN), a controller area network (CAN), which is based on an ISO standard bus for vehicles, etc. The CAN manages the chassis electrical system control and responsible for critical-classified activities such as engine electrics and skid control FIG. 6 is an illustration of a message frame for a message 600 that may be used in the transmission and/or receipt of messages such as the control message 302 and the mirror feedback message 304 (see, e.g., FIGS. 3 and 4). Generally, the message frame provides a format for commands to devices in the vehicular network 500.

The message frame may have a format including a header field with a start bit 602, a master address field 604, a slave address field 606, a control field 608, a data length field 610, and application data field 612, which corresponds with the data length field 610. As may be appreciated, other message formats may be implemented to provide communication within the vehicle network 500, and may be based on packet-based network protocol specifications, such as IEEE 802.3, 802.11, 802.20, Bluetooth, etc., and variations thereof.

A second message is shown for a second control unit of the vehicle network 500, which repeats the structure for another device via a master address field 614 and a slave address field 616. As may be appreciated, the input from the configurable application input module 216, and the application selection input data 514 affect both upper and lower display control units 510 and 512, and the graphic user interface displayed on the lower display device 104 and the upper display device 106. Messages may be generated addressed for the respective control unit of the vehicle network 500, or the message may be broadcast, with the upper display control unit 510 and the lower display control unit 512 including sufficient intelligence to distinguish the present operational mode (that is, "locked" or "unlocked"), and treating the data accordingly.

Communication of the message 600 may be from one control unit to another, or may be broadcast (as indicated by a broadcast field) to all control units via the vehicle network 500. Each control unit on the vehicle network 500 bus has a unique identifier (address) that indicates its device type. Because the upper and lower display control units 510 and 512 may be classified with the same device type, a secondary identifier may be implemented to further distinguish the location of the display devices.

In the example provided, the master address field 604 indicates the HMI control unit 210. The slave address field 606 indicates the destination unit, which may be the upper display control unit 510 or the lower display control unit 512. The control field 608 may designate the operational mode for the lower and upper display devices 104 and 106, such as "locked" in the first operational mode, or "unlocked" in the second operational mode.

Figure 7:
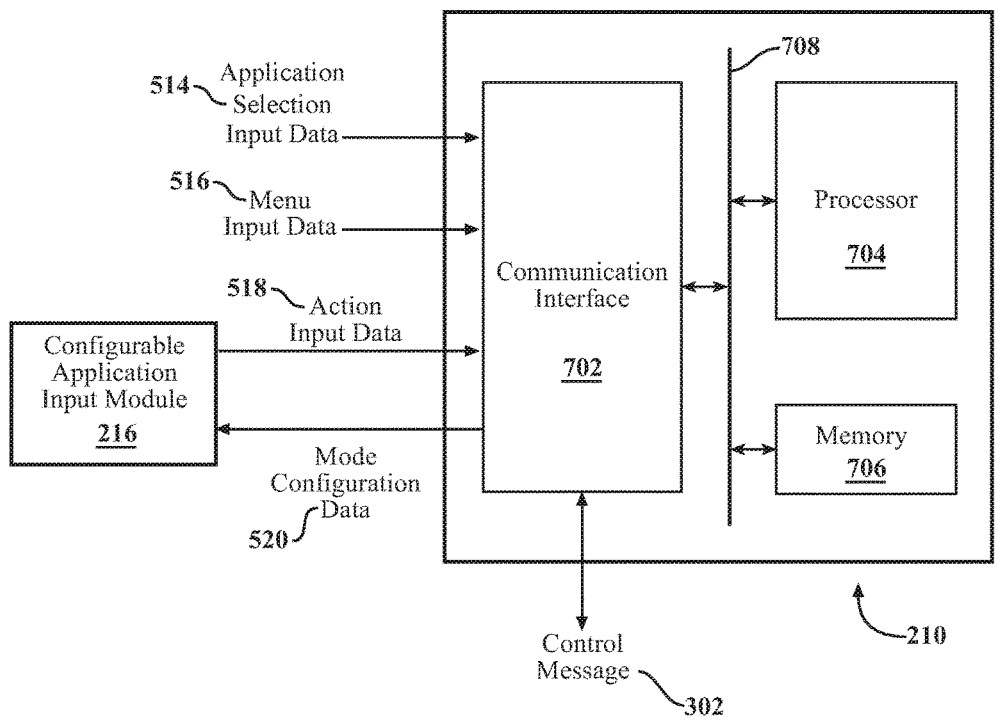
FIG. 7 is a block diagram of a HMI control unit of FIGS. 1-6.

FIG. 7 is a block diagram of a HMI control unit 210. The HMI control unit 210 includes a communication interface 702, a processor 704, and memory 706, that are communicatively coupled via a data bus 708.

The processor 704 in the HMI control unit 210 can be a conventional central processing unit or any other type of device, or multiple devices, capable of manipulating or processing information. As may be appreciated, the processor 704 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 706 may be a single memory device, a plurality of memory devices, and/or embedded circuitry of the processor 704. Such a memory device may be a read-only memory, random access memory, volatile memory, non-volatile memory, static memory, dynamic memory, flash memory, cache memory, and/or any device that stores digital information.

Note that if the processor 704 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 704 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 704 executes, hard coded and/or operational instructions corresponding to at least some of the steps and/or functions illustrated in FIGS. 1-10 to perform human-machine interface features and methods described herein.

The communication interface 702 generally governs and manages the user input data including application selection input data 514, menu input data 516, and action input data 518, and also manages controller unit output data, which includes the mode configuration data 520 and the message 600 generation and transmission to the vehicle network 500 (see FIG. 5). There is no restriction on the present disclosure operating on any particular hardware arrangement and therefore the basic features herein may be substituted, removed, added to, or otherwise modified for improved hardware and/or firmware arrangements as they may develop.

The structure of the HMI control unit 210 may also be used as an acceptable architecture of the upper display control unit 510 and the lower display control unit 512. The upper and lower display control units 510 and 512 may each include a communication interface, a processor, and memory that may be communicatively coupled via a data bus. As may be appreciated, other architectures may be implemented, with similar functional capabilities.

The processors for the upper and lower display control units 510 and 512 may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the upper and lower display control units 510 and 512 may be a single memory device, a plurality of memory devices, and/or embedded circuitry of the processor related to the upper and lower display control units 510 and 512. Such a memory device may be a read-only memory, random access memory, volatile memory, non-volatile memory, static memory, dynamic memory, flash memory, cache memory, and/or any device that stores digital information.

Note that if the processor for each of the upper and lower display control units 510 and 512 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor for each of the upper and lower display control units 510 and 512 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 704 executes, hard coded and/or operational instructions corresponding to at least some of the steps and/or functions illustrated in FIGS. 1-10 to perform human-machine interface features and methods described herein.

The communication interface for each of the upper and lower display control units 510 and 512 generally governs and manages the user input data received via the vehicle network 500, and outbound data to/from the upper display device 106 and the lower display device 104, respectively. There is no restriction on the present disclosure operating on any particular hardware arrangement and therefore the basic features herein may be substituted, removed, added to, or otherwise modified for improved hardware and/or firmware arrangements as they may develop.

Figure 8:
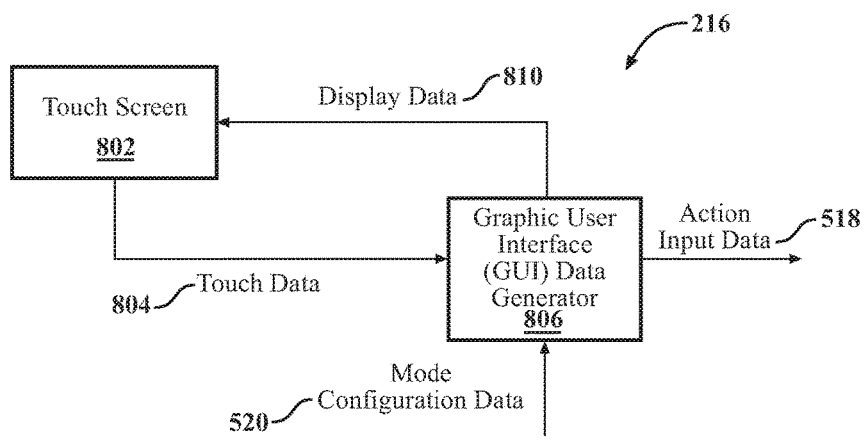
FIG. 8 is a block diagram of a configurable application input module of FIGS. 1-7.

FIG. 8 presents a block diagram of a configurable application input module 216. In particular, the configurable application input module 216 is presented for use in conjunction with the HMI control unit 210 that hosts a touch screen 802. Touch screen 802 may include a display screen, such as a liquid crystal display (LCD), light emitting diode (LED), plasma display or other two dimensional or three dimensional display that displays graphics, text or video in either monochrome or color in response to display data 810.

In operation, the configurable application input module 216 generates display data 810 for display on the touch screen 802. For example, the display data 810 creates a visual representation of a graphic user interface when displayed on the touch screen 802 that can be used interactively by the vehicle user.

In particular, a graphic user interface (GUI) data generator 806 processes touch data 804 from the touch screen 802 to determine when the touch data 804 indicates user interaction with icons of the graphic user interface. When the touch data 804 indicates user interaction with the graphic user interface, the GUI data generator 806 operates based on the touch data 804 to adjust the display data 810 to reflect the user interaction with the touch screen 802. In addition, the GUI data generator 806 generates action input data 518 based on the user interaction with the touch screen 802.

Moreover, the GUI data generator 806 receives mode configuration data 520 to generate the display data 810, which in turn provides a graphic user interface displayed by the touch screen 802. The mode configuration data 520 indicates the application graphic user interface for which the configurable application input module 216 is being altered or presented for vehicle user input. The application as discussed herein, is based upon the vehicle user selection by application selection input data 514 and/or menu input data 516 (see FIG. 5). Further, the mode configuration data 520 includes data regarding the operational mode for the configurable application input module 216. That is, the graphic user interface for the touch screen 802 has a version for a first operational mode (that is, a locked mode) and a second operational mode (that is, an unlocked mode) relating to the application selection by the vehicle user.

Initially, or upon startup, the configurable application input module 216 is in the first operational mode. In the first operational mode, for example, the configurable application input module 216 operates to manipulate the lower display device 104, and the upper display device 106 mirrors the user inputs to the lower display device 104 (see FIGS. 3 and 4). As follows, when in the second operational mode, the configurable application input module 216 operates to manipulate the upper display device 106, and the lower display device 104 mirrors the user inputs to the upper display device 106.

On the other hand, in a first operational mode, for further example, the configurable application input module 216 operates to manipulate the upper display device 106, and the lower display device 104 mirrors the user inputs to the upper display device 106. As follows, when in the second operational mode, the configurable application input module 216 then operates to manipulate the lower display device 104, and the upper display device 106 mirrors the user inputs to the lower display device 104.

The screens associated with each of the first and the second operational mode may be defined by the vehicle user via the configurable application input module 216, may be initially defined by the HMI control unit 210, may be defined by downloadable data that is accessible via the gateway 504, etc.

The action input data 518 based on the user's manipulation of the touch screen 802 can be used in conjunction with another display generator of the upper display control unit 510 and the lower display control unit 512 (see FIG. 5) to generate display data for the lower display device 104 and the upper display device 106. For example, the display of at least one other graphic user element 115*a* and 115*b* is adjusted based on the action input data 518 (see, e.g., FIG. 3).

User interactions with touch screen 802 generate touch data 804 that can be used by the configurable application input module 216 to control, for example, the position, orientation and/or motion of an object that is displayed on the touch screen 802, and also elements of the lower display device 104 and/or the upper display device 106 via the action input data 518.

Such a graphical object can be a game object or character, a cursor, a highlighted area, tab, menu item, or other graphical object displayed by the touch screen 802 that may also be displayed by the lower display device 104, and/or by the upper display device 106 as discussed herein.

The GUI data generator 806 can be implemented using either dedicated or shared processing resources that can include a microprocessor, micro-controller, digital signal processor, graphics processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory. Note that when the GUI data generator 806 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Figure 9:
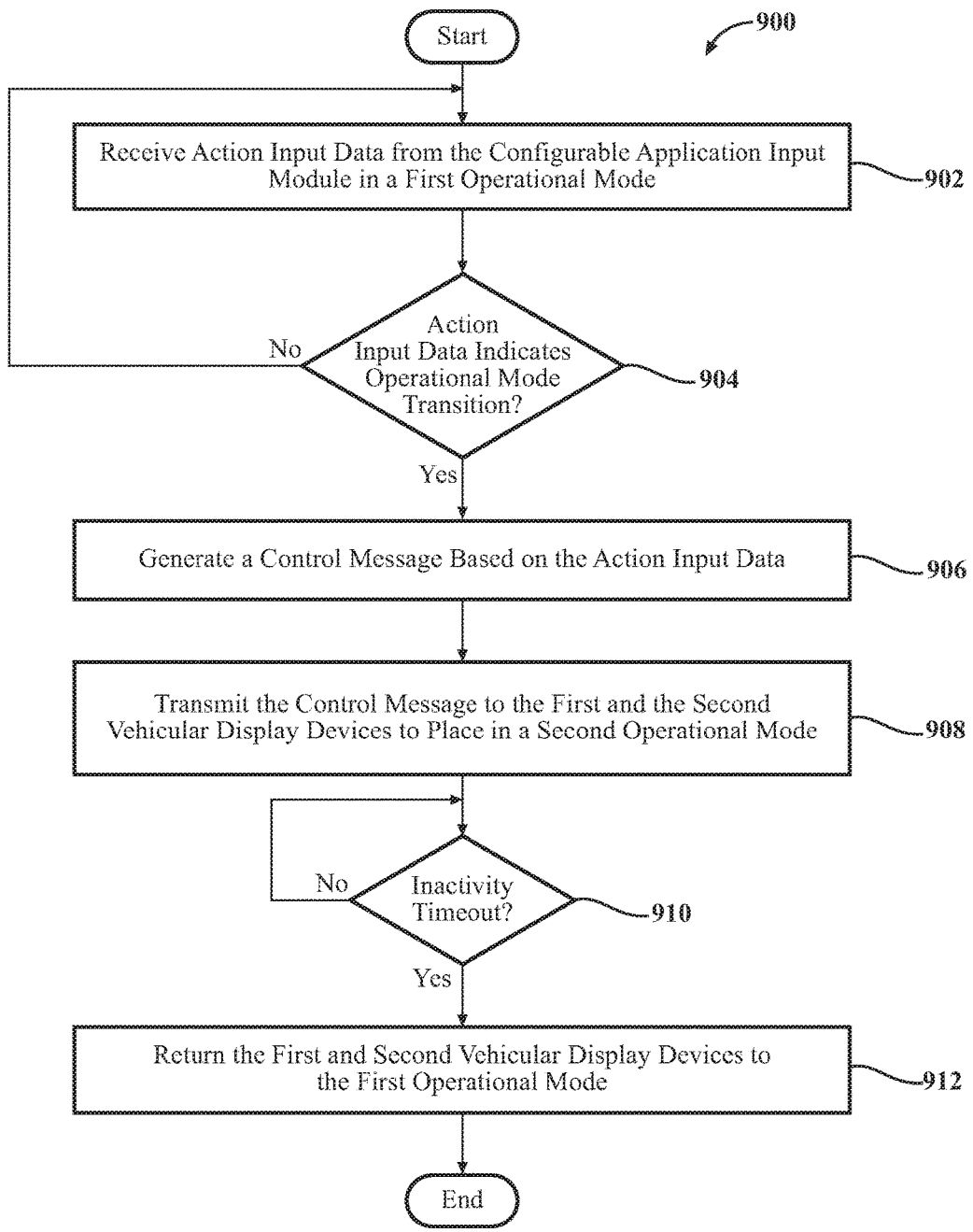
FIG. 9 is an example process for configuring a configurable application input module in a HMI control unit for a plurality of vehicular display devices.

FIG. 9 is an example process 900 for configuring a configurable application input module in a human machine interface (HMI) control unit for a plurality of vehicular display devices. The operations described in connection the process 900 can be performed at the HMI control unit 210 (see, e.g., FIGS. 1-8). For example, the operations described in connection with the process 900 can be stored in the memory 706, and executed by the processor 704 (see, e.g., FIG. 7).

At operation 902, the HMI control unit receives action input data from a configurable application input module 216. Initially, the HMI control unit places the configurable application module 216 is in a first operational mode. In the first operational mode, which also may be referred to as a locked mode, a first vehicular display device operates as a master vehicular display device relative to a second vehicular display device. In the first operational mode, the second vehicular display operates to provide mirrored feedback corresponding to the first vehicular display device. In this manner, the relational configuration of the displays expected or desired by the vehicle user remains consistent during vehicle operation.

The HMI control unit, at operation 904, determines whether the action input data received from the configurable application input module 216 indicates a transition mode from the first operational mode to the second operational mode.

The action input data may indicate that a vehicle user provided a key or depression pattern (or motion pattern) to prompt the control to move from a locked operational mode to an unlocked operational mode. The pattern may include a steady press by a finger for a duration of time, or circular pattern of a finger for a duration of time, or a pattern (such as a depression on a top-bottom-left-right circumference of the control).

The first and the second vehicular display devices may be defined, by way of example, as a lower display device and an upper display device, respectively.

In the locked operational mode of the present example, a vehicle user may manipulate a display for the lower display device with a mirrored feedback to the vehicle user by a display of the upper display device. In an unlocked operational mode, the vehicle user may manipulate a display for the upper display device with a mirrored feedback to the vehicle user by a display of the lower display device.

As may be further appreciated, the operational modes may be reversed for the display units based upon the designation of the display devices.

On the other hand, as a further example, the first and the second vehicular display devices may be defined as an upper display device and a lower display device, respectively. For example, in the locked operational mode, a vehicle user may manipulate a display for the upper display device with a mirrored feedback to the vehicle user by a display of the lower display device. In an unlocked operational mode, the vehicle user may manipulate a display for the lower display device with a mirrored feedback to the vehicle user by a display of the upper display device.

Such vehicle display designations may be placed as a default configuration upon manufacture and/or installation of the devices with a vehicle, may be altered by the vehicle user, etc.

When the action input data indicates a transition from the first operational mode to a second operational mode, the HMI control unit causes the second vehicular display device of the plurality of vehicular display devices to operate as the master vehicular display device and that the first vehicular display device to operate to provide the mirrored feedback relating to a subsequent action input data affecting a corresponding graphic user element of the second vehicular display device.

The transition may carried as set out by operations 906 and 908, for example. At operation 906, a control message is generated based on the action input data, the control message including a first identifier for the first vehicular display device and a second identifier for a second vehicular display device. The control message operates to indicate that the second vehicular display device of the plurality of vehicular display devices operates as the master vehicular display device and that the first vehicular display device operates to provide the mirrored feedback relating to a subsequent action input data affecting a corresponding graphic user element of the second vehicular display device.

In this manner, though the vehicle display devices may receive similar input subsequent action input data from a vehicle user, the focus by the vehicle will be to a selected display, and the selection activity will take place with regard to the selected display. For example, referring briefly to FIG. 4, when in the second operational mode, the selection or manipulation of the graphic user element 402*a* takes place relative to the active application mirror zone 122 of the upper display device 106. In this manner, the attention of the vehicle user remains on the road and/or path ahead. The lower display device 104 serves to provide mirror feedback via the mirrored feedback message 304, which may be generated and transmitted via the upper display device 106 to the lower display device 104, or may be generated by the HMI control unit 210 and transmitted to each of the lower and upper display devices 104 and 106 via the vehicle network 500 (see FIG. 5).

At operation 908, in the example provided, the HMI control unit 210 operates to transmit the control message to place the first and the second vehicular display devices in the second operational mode.

In a further operation, the HMI control unit 210 may revert to the first operational mode with respect to the first and the second vehicular display devices. At operation 910, for example, the HMI control unit 210 determines whether there has been inactivity for a period of time, resulting in an inactivity timeout. When an inactivity time period expires, then at operation 912, the first vehicular display device and the second vehicular display device are returned to the first operational mode.

To revert to the first operational mode, by way of example, an inactivity control message including a first identifier for the first vehicular display device and a second identifier for a second vehicular display device and is transmitted at operation 912 to the vehicular display devices. The control message includes data and/or instructions causing the first vehicular display device to again operate as the master vehicular display device and that the second vehicular display device again operates to provide the mirrored feedback relating to a subsequent action input data affecting a corresponding graphic user element of the first vehicular display device.

FIG. 10 is an example process 1000 in a configurable application input module of a human machine interface (HMI) device may display application controls (such as for music, navigation, telephony, vehicle status, etc.) to a vehicle user. Also, with regard to the graphic user interface, the configurable application input module may further be changed to different designs and display formats for its associated display screen, such as a first display for a first operational mode for a selected application and a second display for a second operational mode for the selected application.

In this manner, the operations described in connection with the process 1000 can be performed at the configurable application input module 216 (see, e.g., FIGS. 1-8). The operations described in connection with the process 1000 can also be embodied as a non-transitory computer readable storage medium including program instructions executable by one or more processors that, when executed, cause the one or more processors to perform the operations described herein. For example, the operations described in connection with the process 1000 can be stored and executed in a memory device of the GUI data generator 806 (see, e.g., FIG. 8).

In operation 1002, the HMI device configures a configurable application input module 216 (see FIGS. 1-8) with a first graphic user interface associated with application selection input data in a first operational mode. At operation 1004, the configurable application input module 216 receives mode configuration data, which may include data for an operational transition for operation with respect to vehicular display devices.

When, at operation 1006, the mode configuration data indicates an operational transition, the configurable application input module 216 is configured with a second graphic user interface at operation 1008, the second graphic user interface being associated with the application selection input data in a second operational mode.

In a further operation, the display screen of the configurable application input module 216 may revert to the first graphic user interface for the first operational mode with respect to the first and the second vehicular display devices. At operation 1010, the HMI device determines whether there has been inactivity for a period of time, resulting in an inactivity timeout. When an inactivity time period expires, then at operation 1012, the configurable application input module 216 returns to the first operational mode with the first graphic user interface associated with the application selection input data.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a HMI control unit for providing vehicle user input in first and second operational modes with respect to first and second vehicle display devices of a vehicle.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a human machine interface (HMI) control unit for a first vehicular display device and a second vehicular display device, the method comprising:
   displaying a graphic user element on the first vehicular display device and designating a corresponding first graphic user interface of a configurable application input module for manipulating the graphic user element of the first vehicular display device in a first operational mode, wherein in the first operational mode, the first vehicular display device operates as a master vehicular display device relative to the second vehicular display device, and the second vehicular display device operates to provide mirrored feedback relating to action input data from the configurable application input module affecting the graphic user element of the first vehicular display device; and
   when a command is received to transition from the first operational mode to a second operational mode, displaying a graphic user element on the second vehicular display device and designating a corresponding second graphic user interface of the configurable application input module for manipulating the graphic user element of the second vehicular display device in the second operational mode, wherein in the second operational mode, the second vehicular display device operates as a master vehicular display device relative to the first vehicular display device, and the first vehicular display device operates to provide mirrored feedback relating to subsequent action input data from the configurable application input module affecting the graphic user element of the second vehicular display device.

2. The method of claim 1, further comprising:
   when an inactivity time period expires, returning to the first operational mode.

3. The method of claim 1, further comprising:
   receiving application selection input data that identifies an application of a plurality of applications of the first vehicular display device;
   transmitting, in response to the application selection input data, first mode configuration data to the configurable application input module, wherein the first mode configuration data designates the first graphic user interface of the configurable application input module in the first operational mode; and
   when the command is received to transition from the first operational mode to the second operational mode, transmitting second mode configuration data to the configurable application input module to designate the second graphic user interface of the configurable application input module in the second operational mode.

4. The method of claim 3, further comprising:
   activating, based on the application selection input data, an application of one of a plurality of display zones of the first vehicular display device; and
   activating a feedback application for an application mirror zone of the second vehicular display device relating to the application.

5. The method of claim 3, wherein the application selection input data is received from a hotkey of a plurality of hotkeys, wherein each of the plurality of hotkeys correspondingly defines one of the plurality of applications.

6. The method of claim 1, wherein:
   the first vehicular display device is a console display device; and the second vehicular display device is a heads-up display device.

7. A human machine interface (HMI) control unit comprising:
- a communication interface to service communication with vehicular devices;
- one or more processors coupled to the communication interface, the one or more processors for controlling operations of the HMI control unit; and
- a memory coupled to the one or more processors, the memory for storing data and program instructions used by the one or more processors, wherein the one or more processors are configured to execute instructions stored in the memory to:
  - display a graphic user element on a first vehicular display device and designate a corresponding first graphic user interface of a configurable application input module for manipulating the graphic user element of the first vehicular display device in a first operational mode, wherein in the first operational mode, the first vehicular display device operates as a master vehicular display device relative to a second vehicular display device, and the second vehicular display device operates to provide mirrored feedback relating to action input data from the configurable application input module affecting the graphic user element of the first vehicular display device; and
  - when a command is received to transition from the first operational mode to a second operational mode, display a graphic user element on the second vehicular display device and designate a corresponding second graphic user interface of the configurable application input module for manipulating the graphic user element of the second vehicular display device in the second operational mode, wherein in the second operational mode, the second vehicular display device operates as a master vehicular display device relative to the first vehicular display device, and the first vehicular display device operates to provide mirrored feedback relating to subsequent action input data from the configurable application input module affecting the graphic user element of the second vehicular display device.

8. The HMI control unit of claim 7, wherein the one or more processors are further configured to execute further instructions stored in the memory to:
- return to the first operational mode upon expiration of an inactivity time period.

9. The HMI control unit of claim 7, wherein the one or more processors are further configured to execute further instructions stored in the memory to:
- receive application selection input data that identifies an application of a plurality of applications of the first vehicular display device;
- transmit, in response to the application selection input data, first mode configuration data to the configurable application input module, wherein the first mode configuration data designates the first graphic user interface of the configurable application input module in the first operational mode; and
- when the command is received to transition from the first operational mode to the second operational mode, transmit second mode configuration data to the configurable application input module to designate the second graphic user interface of the configurable application input module in the second operational mode.

10. The HMI control unit of claim 9, wherein the one or more processors are further configured to execute further instructions stored in the memory to:
- activate, based on the application selection input data, an application of one of a plurality of display zones of the first vehicular display device; and
- activate a feedback application for an application mirror zone of the second vehicular display device relating to the application.

11. The HMI control unit of claim 9, wherein the application selection input data is received from a hotkey of a plurality of hotkeys, wherein each of the plurality of hotkeys correspondingly defines one of the plurality of applications.

12. The HMI control unit of claim 7, wherein:
- the first vehicular display device is a console display device; and
- the second vehicular display device is a heads-up display device.

13. A human machine interface (HMI) device for use in a vehicle, the HMI device comprising:
- a configurable application input module configured to be accessible through a control surface of the vehicle, the configurable application input module including:
  - a touch screen display; and
  - a graphic user interface (GUI) data generator coupled to the touch screen display and operable to generate graphic user interfaces for display by the touch screen display; and
- a HMI control unit in communication with the configurable application input module, the HMI control unit including:
  - a wireless communication interface to service communication with vehicular devices;
  - one or more processors coupled to the wireless communication interface, the one or more processors for controlling operations of the HMI control unit; and
  - a memory coupled to the one or more processors, the memory for storing data and program instructions used by the one or more processors, wherein the one or more processors are configured to execute instructions stored in the memory to:
    - display a graphic user element on a first vehicular display device and designate a corresponding first graphic user interface of the touch screen display for manipulating the graphic user element of the first vehicular display device in a first operational mode, wherein in the first operational mode, the first vehicular display device operates as a master vehicular display device relative to a second vehicular display device, and the second vehicular display device operates to provide mirrored feedback relating to action input data from the configurable application input module via the touch screen display affecting the graphic user element of the first vehicular display device; and
    - when a command is received to transition from the first operational mode to a second operational mode, display a graphic user element on the second vehicular display device and designate a corresponding second graphic user interface of the touch screen display for manipulating the graphic user element of the second vehicular display device in the second operational mode, wherein in the second operational mode, the second vehicular display device operates as a master vehicular display device relative to the first vehicular display device, and the first vehicular display device operates to provide mirrored feedback relating to subsequent action input data from the configurable application input module via the touch screen display affecting the graphic user element of the second vehicular display device.

14. The HMI device of claim 13, wherein the one or more processors are further configured to execute further instructions stored in the memory to:
  return to the first operational mode upon expiration of an inactivity time period.

15. The HMI device of claim 13, wherein the one or more processors are further configured to execute further instructions stored in the memory to:
  receive application selection input data that identifies an application of a plurality of applications of the first vehicular display device;
  transmit, in response to the application selection input data, first mode configuration data to the GUI data generator, wherein the first mode configuration data designates the first graphic user interface of the touch screen display in the first operational mode; and
  when the command is received to transition from the first operational mode to the second operational mode, transmit second mode configuration data to the GUI data generator to designate the second graphic user interface of the touch screen display in the second operational mode.

16. The HMI device of claim 15, wherein the one or more processors are further configured to execute further instructions stored in the memory to:
  activate, based on the application selection input data, an application of one of a plurality of display zones of the first vehicular display device; and
  activate a feedback application for an application mirror zone of the second vehicular display device relating to the application.

17. The HMI device of claim 15, wherein the application selection input data is received from a hotkey of a plurality of hotkeys, wherein each of the plurality of hotkeys correspondingly defines one of the plurality of applications.

18. The HMI device of claim 14, wherein:
  the first vehicular display device is a console display device; and
  the second vehicular display device is a heads-up display device.

* * * * *

UNITED STATES PATENT AND TRADEMARK OFFICE
CERTIFICATE OF CORRECTION

PATENT NO. : 10,353,658 B2  
APPLICATION NO. : 15/272699  
DATED : July 16, 2019  
INVENTOR(S) : Tsai et al.

Page 1 of 1

It is certified that error appears in the above-identified patent and that said Letters Patent is hereby corrected as shown below:

In the Specification

Column 7, Line 62: replace "mirror zone 122" with --application mirror zone 122--  
Column 9, Line 44: replace "applicaion" with --application--

Signed and Sealed this  
Third Day of March, 2020

Andrei Iancu  
*Director of the United States Patent and Trademark Office*